(12) United States Patent
Lizotte et al.

(10) Patent No.: US 11,187,321 B2
(45) Date of Patent: Nov. 30, 2021

(54) CONTROL SYSTEM FOR AUXILIARY POWER SOURCE

(71) Applicant: UUSI, LLC, Reed City, MI (US)

(72) Inventors: Curtis M. Lizotte, Tustin, MI (US);
Mario Boisvert, Big Rapids, MI (US);
Richard Felicioni, Ada, MI (US)

(73) Assignee: UUSI, LLC, Reed City, MI (US)

( * ) Notice: Subject to any disclaimer, the term of this patent is extended or adjusted under 35 U.S.C. 154(b) by 0 days.

(21) Appl. No.: 16/701,744

(22) Filed: Dec. 3, 2019

(65) Prior Publication Data

US 2020/0123739 A1    Apr. 23, 2020

Related U.S. Application Data

(63) Continuation-in-part of application No. 14/617,713, filed on Feb. 9, 2015, now Pat. No. 10,495,220.

(51) Int. Cl.
| *F16H 61/47* | (2010.01) |
| *H02P 9/04* | (2006.01) |
| *F15B 11/05* | (2006.01) |
| *F15B 11/042* | (2006.01) |
| *H02P 101/45* | (2016.01) |

(52) U.S. Cl.
CPC ............ *F16H 61/47* (2013.01); *F15B 11/055* (2013.01); *F15B 11/0426* (2013.01); *F15B 2211/40592* (2013.01); *F15B 2211/413* (2013.01); *F15B 2211/41572* (2013.01); *F15B 2211/427* (2013.01); *F15B 2211/7058* (2013.01);
(Continued)

(58) Field of Classification Search
None
See application file for complete search history.

(56) References Cited

U.S. PATENT DOCUMENTS

| 2,888,810 A | 6/1959 | Hann |
| 2,892,312 A | 6/1959 | Allen et al. |

(Continued)

FOREIGN PATENT DOCUMENTS

DE  10 2012 019 232 A1   4/2014

OTHER PUBLICATIONS

A.M.P.S. (Advanced Modular Power Systems), 142 pages.
(Continued)

*Primary Examiner* — Thomas E Lazo
*Assistant Examiner* — Michael Quandt
(74) *Attorney, Agent, or Firm* — Howard & Howard Attorneys PLLC

(57) ABSTRACT

A control system includes a variable displacement hydraulic pump, the pump having an inlet for receiving fluid, an outlet for discharging fluid under pressure, and a pump displacement input, a hydraulic motor having an inlet and an outlet, a fluid circuit including a supply conduit for conducting fluid discharged by the pump to the motor and a return conduit for returning fluid discharged by the motor to the pump, a pump displacement control cooperating with the pump displacement input in order to vary a displacement of the pump, a control circuit in communication with the pump displacement control for controlling the pump output such that the motor is driven at a constant rotational speed, and a system controller in communication with the control circuit and a remote location to transmit and receive information to and from the remote location.

24 Claims, 15 Drawing Sheets

(52) U.S. Cl.
CPC ............. *F15B 2211/75* (2013.01); *H02P 9/04* (2013.01); *H02P 2101/45* (2015.01)

(56) References Cited

U.S. PATENT DOCUMENTS

| | | | |
|---|---|---|---|
| 4,022,021 | A | 5/1977 | Russell, Jr. |
| 4,490,619 | A | 12/1984 | McMinn |
| 4,644,748 | A | 2/1987 | Goss, Jr. et al. |
| 4,879,501 | A | 11/1989 | Haner |
| 4,949,541 | A | 8/1990 | de Vietro |
| 5,077,975 | A | 1/1992 | Kauss |
| 5,318,226 | A | 6/1994 | Kime et al. |
| 6,394,206 | B1 | 5/2002 | Fury |
| 6,848,255 | B2 | 2/2005 | Chiaramonte |
| 7,053,498 | B1 | 5/2006 | Boisvert et al. |
| 7,093,383 | B2 | 8/2006 | Mennen et al. |
| 7,459,800 | B2 | 12/2008 | Boisvert et al. |
| 7,759,811 | B2 | 7/2010 | Boisvert et al. |
| 8,269,359 | B2 | 9/2012 | Boisvert et al. |
| 8,269,360 | B2 | 9/2012 | Boisvert et al. |
| 8,447,541 | B2 | 5/2013 | Rada et al. |
| 8,751,098 | B2 | 6/2014 | Faus et al. |
| 8,991,167 | B2 | 3/2015 | Yuan et al. |
| 2019/0018379 | A1* | 1/2019 | Miller ................... H04W 4/38 |

OTHER PUBLICATIONS

Fabco Power, Fight Fire with Fire-Power, 4 pages.
Fabco Power, Instruction Manual Hydraulic Generator Set, Model: Hydro-600, 11 pages.
Harrison Hydraulic Generators, Harrison Hydra-Gen, Model 30, 37 pages.
Harrison Hydra-Gen System, 19 pages.
Onan Commercial Mobile Power, Operation and Installation, Series RBAA Hydraulic Generator Sets, 61 pages.
Smart Power Systems, A.C. Modular Generator System ER Series, Owners Manual, 126 pages.
Smart Power Systems, A.C. Modular Generator System HR Series, Owners Manual, 53 pages.
Smart Power Systems, The . . . liberator, 2 pages.
Smart Power Systems, A.C. Modular Generator System M Series, Owners Manual, 32 pages.
Smart Power Systems, A.C. Modular Generator System TM Series, Owners Manual, 51 pages.
Genesys Power Systems, Inc., Hart-A-Gen Modular Units, 34 pages.
High Country Tek, Inc., Hydraulic Generator Controller HGC-2, 54 pages.
Hydra-Force PV70-30 Proportional Flow Control Cartridge, 2 pages.
Kar-Tech, SIMCON (Smart Integrated Modular Control System, Operations and Installation Manual Preliminary, 30 pages.
Mannesmann Rexroth, Generator Speed Controller Model GSC 1, 5 pages.
Moncada, Jack, Smart Power Systems, Smart Products for Mobile Applications, 49 pages.
Smart Power Systems, A.C. Modular Generator System LR Series, Owners Manual, 48 pages.
Eisinger, Claus, "Going in the hole", 1993, Issue 4, 58 pages.
AMP600 Revised specification, New part No. AMP 600B, 62 pages.
Fabco Power, Hydraulic Generators and Vehicle Mounted Generators, 53 pages.
Onan Commercial Mobile, Mobile Generators, 118 pages.
Smeal Fire Apparatus Co., Snyder, NE, www.smeal.com, email: sales@smeal.com, 258 pages.
Motorola Inc. "TMOS: Power MOSFET Transistor Data", 1984.
Sutcliffe, Gary, "Microcontroller Interfacing—Part 9: FET transistor switching", http://www.w9xt.com/page_microdesign_pt9_fet_switching.html, 2009.

* cited by examiner

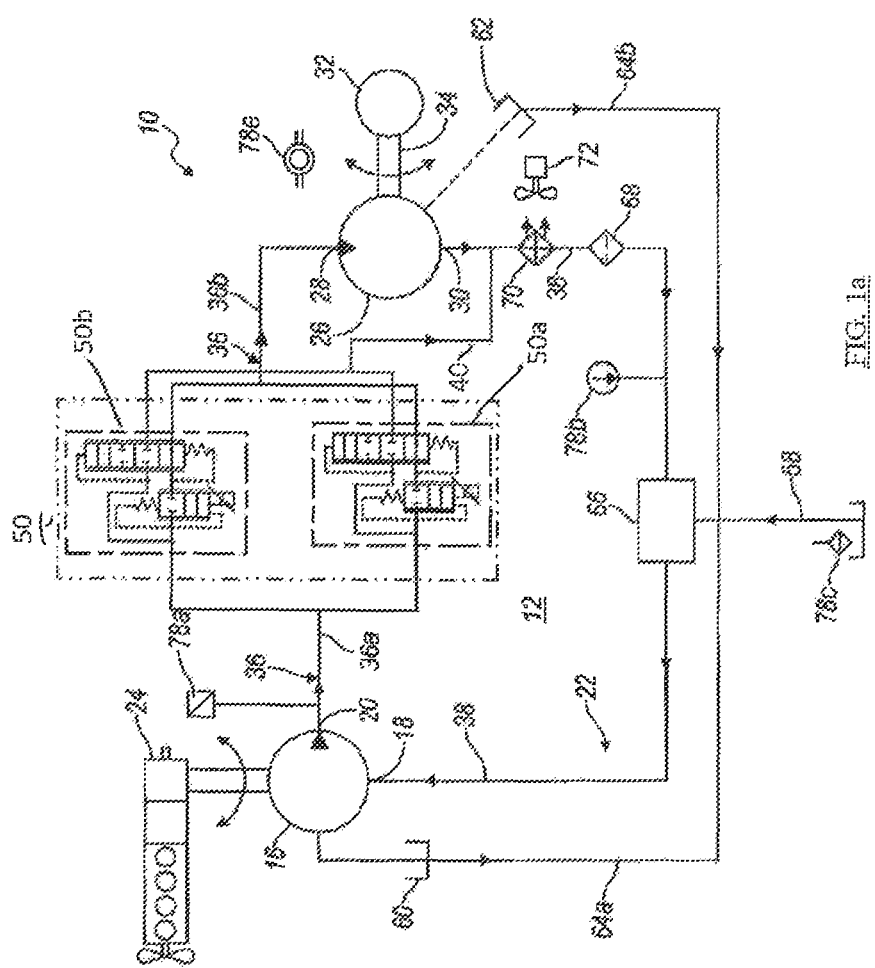

CONTROL SYSTEM FOR AUXILIARY POWER SOURCE

CROSS-REFERENCE TO RELATED APPLICATION(S)

The present application is a continuation-in-part of U.S. Non-Provisional patent application Ser. No. 14/617,713, filed Feb. 9, 2015, the disclosure of which is hereby incorporated by reference in its entirety.

BACKGROUND OF THE INVENTION

1. Field of the Invention

The present invention relates generally to hydraulic systems and, more particularly to, a control system for an auxiliary power source.

2. Description of the Related Art

Most engine driven vehicles utilize an internal combustion engine as a primary power source for propelling the vehicle. However, numerous modules and devices for the vehicle as well as the engine require electrical power. Typically, a rechargeable battery is provided with the vehicle as a basic power supply. The battery provides direct current (DC) electrical power for starting the engine and for operating certain DC compatible electrical loads when the vehicle is not running. The battery is recharged to maintain power by an alternator coupled to and driven by the engine when the vehicle is running. Concurrently, the alternator also provides DC electrical power to the electrical loads of the vehicle.

With the advent of electronics in today's modern vehicle, ground vehicles, boats, and aircraft alike, the amount of electrical loads which require power has significantly increased. Moreover, many various auxiliary electrical loads are dependent upon stable alternating current (AC), for example, rescue and military vehicles having AC powered communications equipment. Additionally, many other vehicles, such as utility and telephone company repair and maintenance vehicles and vehicles providing electrical welding equipment, are increasingly utilizing AC equipment dependent upon clean AC power.

Various systems have been proposed for alleviating the complication of operating both AC and DC powered electrical equipment. One such system involves driving an auxiliary AC generator from the engine or principal power plant of the vehicle. This can be accomplished by connecting the generator to a power take off or to any other suitable connection to an output of the engine. While this will indeed operate a generator, variations in engine speed will wreak havoc with characteristics of power output and therefore with equipment which is dependent upon stable voltage and frequency characteristics of electrical power.

Accordingly, various systems have been proposed to control speed of the AC generator. One such system utilizes a hydraulic circuit having a valve for supplying a constant rate of fluid flow to a hydraulic motor. The hydraulic motor in turn drives the generator for supplying AC power to certain AC compatible electrical loads. However, such systems can have difficulty maintaining precise frequency output for controlling the most sensitive AC equipment and are often susceptible to premature mechanical failure. Therefore, there is a need in the art to provide a new control system for an auxiliary power source.

SUMMARY OF THE INVENTION

It is one object of the present invention to provide a control system for generating precise electrical output characteristics, particularly frequency and voltage output, along with prolonging life of the system, thus reducing warranty returns and costs associated therewith.

Accordingly, the present invention provides a control system including a variable displacement hydraulic pump drivably connectable to a primary power source, the pump having an inlet for receiving fluid, an outlet for discharging fluid under pressure, and a pump displacement input. The control system also includes a hydraulic motor having an inlet for receiving fluid under pressure and an outlet for discharging spent fluid, the motor being drivably connectable to an auxiliary power source. The control system includes a fluid circuit having a supply conduit for conducting fluid discharged by the pump to the motor and a return conduit for returning fluid discharged by the motor to the pump and a pump displacement control cooperating with the pump displacement input in order to vary a displacement of the pump. The control system also includes a control circuit in communication with the pump displacement control for controlling the pump output such that the motor is driven at a constant rotational speed to thereby drive the auxiliary power source at a constant rotational speed despite fluctuations in rotational speed of the primary power source. The control system further includes a system controller in communication with the control circuit and a remote location to transmit and receive information to and from the remote location.

In addition, the present invention provides a control system including a variable displacement hydraulic pump drivably connectable to a primary power source, the pump having an inlet for receiving fluid, an outlet for discharging fluid under pressure, and a pump displacement input. The control system also includes a hydraulic motor having an inlet for receiving fluid under pressure and an outlet for discharging spent fluid, the motor being drivably connectable to an auxiliary power source, a fluid circuit including a supply conduit for conducting fluid discharged by the pump to the motor and a return conduit for returning fluid discharged by the motor to the pump, and a pump displacement control cooperating with the pump displacement input in order to vary the displacement of the pump. The control system further includes a control circuit in communication with the pump displacement control for controlling the pump output such that the motor is driven at a constant rotational speed to thereby drive the auxiliary power source at a constant rotational speed despite fluctuations in rotational speed of the primary power source. The control system includes an interface module having a display in communication with the control circuit for displaying real time system operating characteristics to an operator and a wireless communication connection between the display device and the control circuit. The control system further includes a system controller in communication with the control circuit and a remote location to transmit and receive information to and from the remote location.

One advantage of the present invention is that a new control system is provided for a vehicle that generates precise electrical output characteristics, particularly frequency and voltage output, based on better flow control resolution. Another advantage of the present invention is that the control system includes finer resolution control of the hydraulic fluid flow to the hydraulic motor, thereby enhancing flow capabilities. Yet another advantage of the present invention is that the control system includes at least one, preferably two valves controlling the hydraulic fluid flow to the motor to perform over a wider range of flow variation. Still another advantage of the present invention is that the control system includes an operator interface module to perform routine tasks or monitor information via a wireless connection. A further advantage of the present invention is that the control system may include a personal computer or mobile device applications to perform the same functions as the operator interface module. Still a further advantage of the present invention is that the control system includes a system controller in communication with a control circuit and a remote location to transmit and receive information to and from the remote location to enable cloud-based communication activity.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1a is a schematic view of a control system, according to one embodiment of the present invention.

FIG. 2a is a schematic view of a control circuit, according to one embodiment of the present invention, for the control system of FIG. 1a.

FIG. 12 is a schematic view of a still further embodiment of the control system of FIG. 1.

DESCRIPTION OF THE PREFERRED EMBODIMENT(S)

Figure 1:
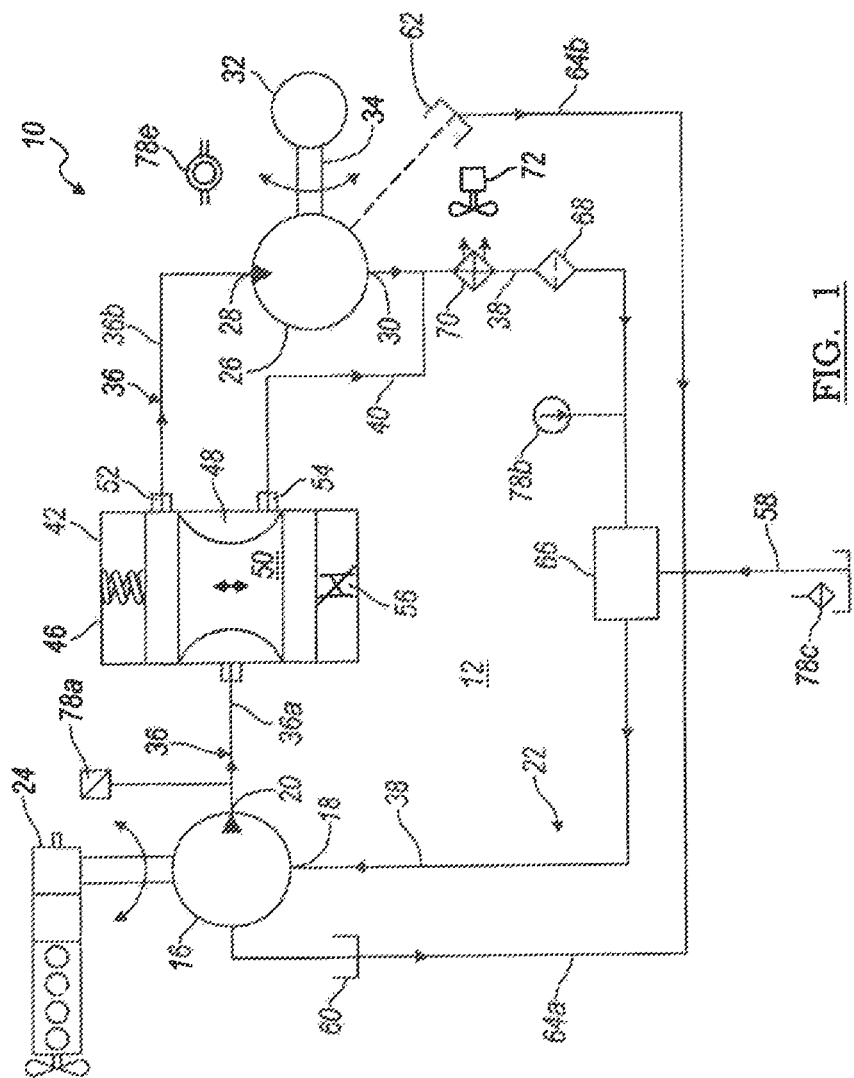
FIG. 1 is a schematic view of a control system.
Figure 2:
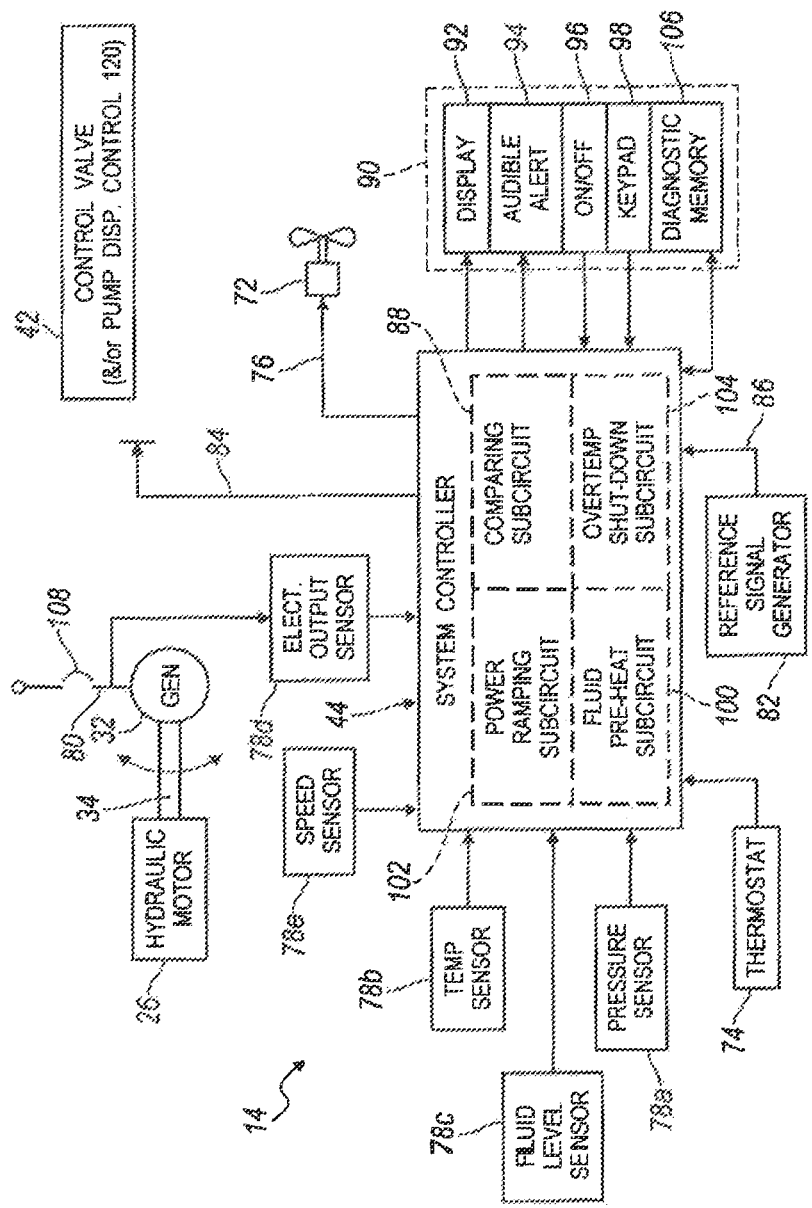
FIG. 2 is a schematic view of a control circuit for the control system of FIG. 1.

Referring to the drawings, one embodiment of a control system 10 is illustrated in FIGS. 1 and 2. The control system 10 includes a hydraulic circuit 12 in FIG. 1 and a control circuit 14 in FIG. 2. As illustrated in FIG. 1, the hydraulic circuit 12 includes a hydraulic pump 16 to power the hydraulic circuit 12. The hydraulic pump 16 has an inlet 18 for receiving fluid for pumping and an outlet 20 for discharging pumped fluid under pressure. In one embodiment, the hydraulic pump 16 can be a variable displacement type pump, a fixed displacement type pump, or the like, for pumping pressurized fluid throughout a fluid circuit 22. In one embodiment, the hydraulic pump 16 can be driven by a primary power source 24, such as a vehicle power take-off (PTO), belt drive, gasoline engine, diesel engine, or any similar input. The hydraulic pump 16 can include a thru-drive so that an additional hydraulic pump or other auxiliary power device can be implemented mechanically in series with the pump 16. It should be appreciated that a vehicle with a hydraulic pump (e.g., garbage truck, fire rescue vehicle, etc.) can be used to provide pressure in a control system 10, for example a hydraulic control system, containing one or more hydraulic circuits 12 on the vehicle. It should also be appreciated that control of each hydraulic circuit 12 can be implemented in a control block, or distribution manifold, where fluid circuits 22 are enabled through control of electro-hydraulic or manual valve assemblies. It should further be appreciated that each hydraulic circuit 12 can then drive a desired hydraulic load (e.g., cylinders, fans, air pumps, hydraulic motors) or external auxiliary connections which are made via hoses and fittings to an external load.

The hydraulic circuit 12 also includes a hydraulic motor 26, having an inlet 28 for receiving fluid under pressure and an outlet 30 for discharging spent fluid. In one embodiment, the hydraulic motor 26 can also be an external load connected via hoses and fittings to a distribution block and thus able to be attached to or removed from the vehicle and vehicle control system 10 as desired. The hydraulic motor 26 drives an auxiliary power source 32, which provides electrical or mechanical power to loads or devices (not shown) of the vehicle. For example, the auxiliary power source 32 can be an AC generator, a mechanical drive system, or other source requiring constant rotational speed. Additionally, an electronic inverter or converter (not shown) can be added to the output of the auxiliary power source 32 to create a secondary power output type or to create two or more output types simultaneously. In one embodiment, the hydraulic motor 26 can be drivably connected to the auxiliary power source 32 through a shaft 34 (as shown in FIGS. 1 and 2) or a belt or other means of power transmission (not illustrated). In one embodiment, the hydraulic motor 26 can be a fixed displacement gear type motor, vane type motor, piston type motor, or the like.

The control system 10 may contain a switch or multiple switches (not shown) to select the electrical output. The switch or switches may be mechanically or electrically actuated and be capable of selecting various voltages, frequencies, or power types such as AC to DC.

The fluid circuit 22 includes a supply conduit 36, a return conduit 38, and a bypass conduit 40. The conduits 36, 38, and 40 can utilize quick disconnect hydraulic fittings to aid in quick installation or removal of any applicable component, or when connected as an external load to the control system 10. The supply conduit 36 can be divided into at least two sections—a valve supply conduit 36a and a motor supply conduit 36b. The supply conduit 36 conducts fluid discharged by the pump 16 to the motor 26, while the return conduit 38 returns fluid discharged by the motor 26 to the pump 16. The bypass conduit 40 conducts fluid discharged by the pump 16 directly to the return conduit 38, bypassing the motor 26, where the fluid is subsequently returned to the pump 16.

In one embodiment, the control system 10 includes a control valve assembly 42, such as an electro-hydraulic control valve assembly, disposed within the hydraulic circuit 12 and controlled by a system controller 44 (shown in FIG. 2) of the control circuit 14. The control valve assembly 42 can be disposed serially and/or parallel with respect to the supply conduit 36 such that valve assembly 42 is interposed between the outlet 20 of the pump 16 and the inlet 28 of the motor 26. The control valve assembly 42 may include a housing 46 generally enclosing a valve chamber 48. The control valve assembly 42 also includes a valve 50 disposed within the valve chamber 48, which shuttles back and forth between an opened position and a closed position. The control valve assembly 42 further includes a first fluid passage 52 (shown in FIG. 3) and a second fluid passage 54. The first fluid passage 52 is in fluid communication with the valve chamber 48 and the motor supply conduit 36b, while the second fluid passage 54 is in fluid communication with the valve chamber 48 and the bypass conduit 40. The control valve assembly 42 includes a solenoid 56 or other electronic or electro-mechanical device drivably connected to the valve 50 for selectively moving the valve 50 incrementally within the valve chamber 48 between the opened and closed positions. In one embodiment, the solenoid 56 may be in electrical communication with the system controller 44, which drives the solenoid 56. It should be appreciated that the system controller 44 can communicate with the control valve assembly 42 such that the valve 50 selectively closes and opens the first fluid passage 52 and the second fluid passage 54, thereby dividing fluid flow proportionally therebetween.

As the valve 50 divides the flow of hydraulic fluid between the first fluid passage 52 and the second fluid passage 54, the fluid can be correspondingly directed to the motor supply conduit 36b and the bypass conduit 40, respectively. Fluid directed to the motor supply conduit 36b may be supplied to, and discharged by, the motor 26 for powering the auxiliary power source 32 before returning to the pump 16 via the return conduit 38. Fluid directed to the bypass conduit 40 can bypass the motor 26 completely as it is steered immediately to the return conduit 38, without being supplied to the motor 26, for restoring to the pump 16.

Referring to FIG. 1a, one embodiment of a control system 10, according to the present invention, is shown. Like parts of the control system 10 of FIG. 1 have like reference numerals for the control system 10 of FIG. 1A. The control system 10 of the present invention achieves enhanced flow capabilities by including finer resolution control of the hydraulic fluid flow to the hydraulic motor 26 and has the ability to perform over a wider range of flow variation. As illustrated in FIG. 1a, the control system 10 includes at least one, preferably two valves 50 disposed between the valve supply conduit 36a and the motor supply conduit 36b. The valves 50 include a first valve 50a and a second valve 50b disposed in parallel with the first valve 50a. In order to increase resolution of control of the hydraulic fluid flow, the second valve 50b can be smaller than the first valve 50a, thus making the control range of the second valve 50b smaller. The first valve 50a can then be used to provide the majority of the hydraulic fluid flow to the hydraulic motor 26 and make proportionally larger adjustments in the hydraulic fluid flow, keeping the control range of the second valve 50b where desired for fine adjustment to the actual desired hydraulic fluid flow rate for the hydraulic motor 26. The internal connections of the valves 50a and 50b in FIG. 1a are represented generically as a standard hydraulic valve. In one embodiment, the valves 50a and 50b are proportional valves. It should be appreciated that the internal details of the valves 50a and 50b may have slight depiction differences.

Figure 1B:
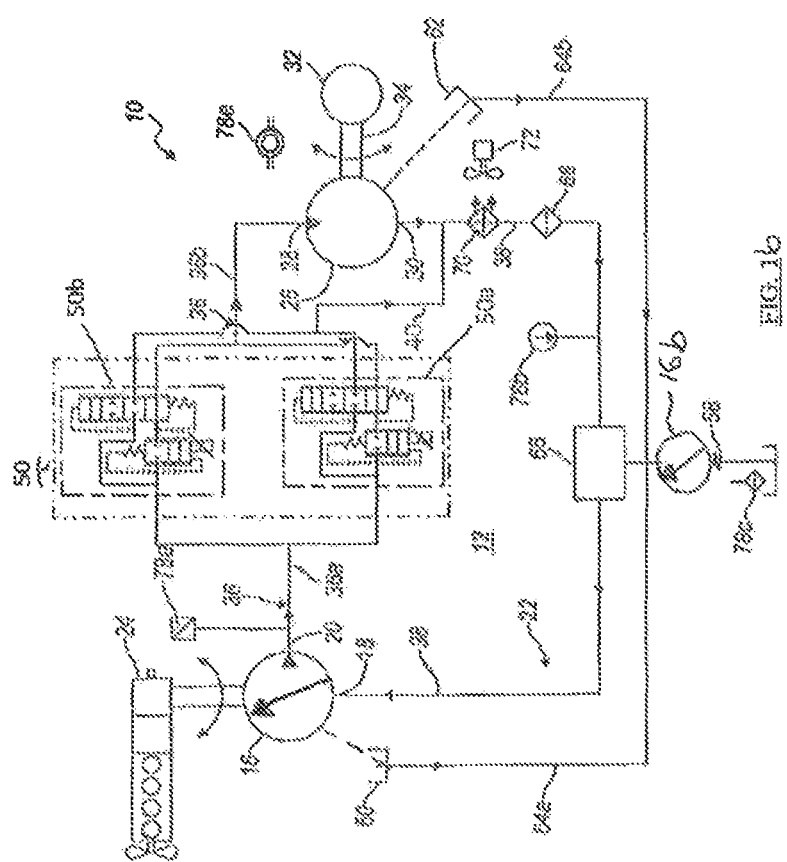
FIG. 1b is a schematic view of a control system, according to another embodiment of the present invention.
Figure 3:
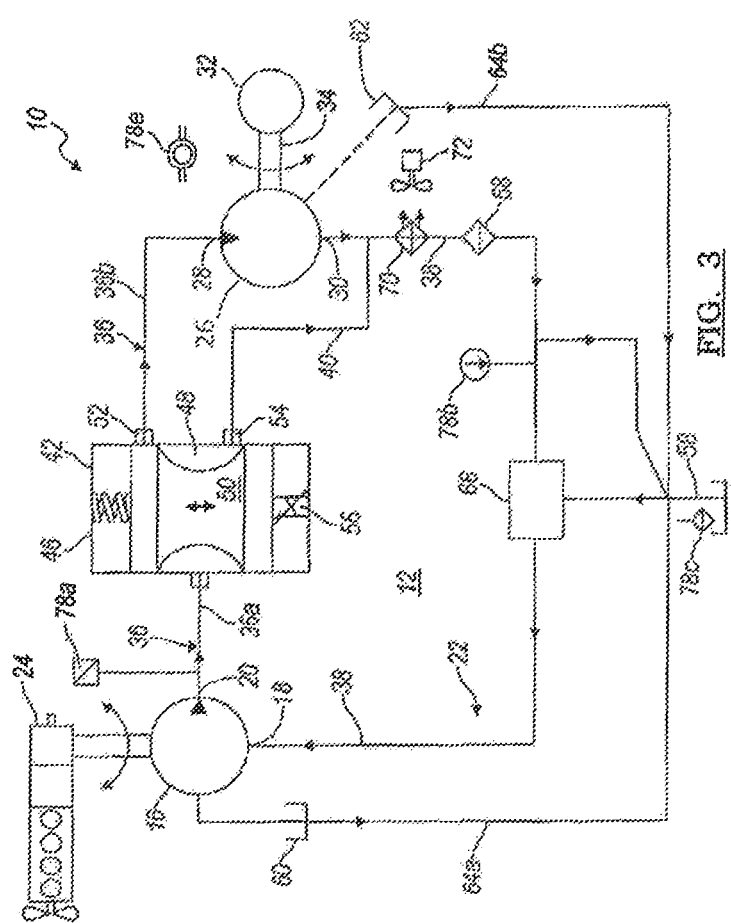
FIG. 3 is a schematic view of another embodiment of the control system of FIG. 1.

As illustrated in FIGS. 1 and 1a, optionally, the hydraulic circuit 12 may include a fluid reservoir 58 and a pump case drain 60 disposed at the pump 16, a motor case drain 62 disposed at the motor 26, or both. The drains 60 and 62 can utilize quick disconnect hydraulic fittings to aid in quick installation or removal of any applicable component. The fluid reservoir 58 can be in fluid communication with the fluid circuit 22 and maintains hydraulic fluid on reserve that can be introduced to the pump 16 via the return conduit 38. In one embodiment, possible case drain flow from the pump 16 and the motor 26 can be directed back to the fluid reservoir 58 through drain conduits 64a-b (as illustrated in FIG. 3). Fluid flow in the return conduit 38 can be directed through a venturi boost 66, where fluid from the fluid reservoir 58 may be drawn into the return conduit 38 to replace that lost from the case drain flow, and supplied back to the pump 16. In another embodiment, a secondary pump or charge pump 16b (FIG. 1b) can be used where fluid from the fluid reservoir 58 may be pumped to the return conduit 38 to replace that lost from the case drain flow and supplied back to the pump 16. In one embodiment, the secondary pump is driven via a thru-drive operation on the pump 16 but, in another embodiment, the secondary pump could be driven by any auxiliary power source. Finally, the drain conduits 64a-b can be disposed in the fluid circuit 22 such that case drain flow can be pulled directly to the return conduit 38 by the venturi boost 66, without first being directed to the fluid reservoir 58.

Additionally, the hydraulic circuit 12 may also include a fluid filter 68 and a fluid cooler 70. The fluid filter 68 and the fluid cooler 70 are disposed serially and/or parallel with respect to return conduit 38. However, it should be appreciated that the fluid filter 68 and the fluid cooler 70 can be disposed anywhere within the fluid circuit 22. Impurities introduced into the hydraulic fluid as it gets cycled through the fluid circuit 22 can be filtered by the fluid filter 68. The fluid cooler 70, on the other hand, can cool fluid that passes therethrough. Accordingly, the fluid cooler 70 may include a heat exchanger (not separately shown) for dissipating heat to ambient air, an electrically or hydraulically operated fan 72 disposed adjacent the heat exchanger for forcing ambient air through the heat exchanger, and a thermostat 74 (FIG. 2) which controls operation of the fan 72 when fluid contained within the fluid cooler 70 exceeds a predetermined temperature. In one embodiment, the thermostat 74 can directly control the fan 72, or, in another embodiment, the thermostat 74 can control operation of the fan 72 through the system controller 44. For example, the thermostat 74 and the fan 72 may be in electrical communication with the system controller 44. It should be appreciated that the system controller 44 may receive temperature readings of the fluid in the fluid cooler 70 from the thermostat 74 and operate the fan 72 by transmitting a fan control signal 76 to the fan 72 when fluid contained within the fluid cooler 70 exceeds the predetermined temperature.

The control system 10 may also include a pressure sensor 78a, a temperature sensor 78b, a fluid level sensor 78c, an electrical output 78d (FIG. 2 only), a speed sensor 78e, and an air temperature sensor (not shown), collectively referred to as system control sensors 78. Each system control sensor 78 can be provided as part of the control circuit 14, shown in FIG. 2, and are configured to provide control inputs to the system controller 44. The system control sensors 78 can be deployed throughout the control system 10 to measure system vitals and assure the auxiliary power source 32 is driven at constant speeds.

Referring again to FIGS. 1 and 1a, the pressure sensor 78a can be disposed along the valve supply conduit 36a proximate the pump 16 to sense hydraulic pressure. However, it should be appreciated that there are many other locations in the fluid circuit 22 for positioning the pressure sensor 78a so long as it can accurately sense that the pump 16 is operating. Similarly, the temperature sensor 78b can be disposed along the fluid circuit 22 to monitor hydraulic fluid temperature. In one embodiment, the temperature sensor 78b can be separate from the thermostat 74 and thus provide a separate input to the system controller 44, or, in another embodiment, the temperature sensor 78b can be the same as the thermostat 74. The fluid level sensor 78c can be disposed within the fluid reservoir 58 to monitor the level of hydraulic fluid within the reservoir 58. If the fluid level becomes low, the system controller 44 may announce a tell-tale alarm to the operator. If the fluid level becomes extremely low, the system controller 44 may cause the control system 10 to shut down entirely to prevent damage to the pump 16. It should be appreciated that the temperature sensor 78b can be disposed in close proximity to the auxiliary power source 32.

In one embodiment, the auxiliary power source 32 can be an AC generator. Accordingly, the electrical output 78d can be a current sensor, voltage sensor, or both for monitoring the generator's operating characteristics, including current, voltage, and frequency. As illustrated in FIG. 2, the electrical output 78d can be connected to output conductors 80 of the auxiliary power source 32 to sense the operating parameters of the auxiliary power source 32. In another embodiment, the speed sensor 78e may be provided to monitor rotational speed of the motor 26 and the shaft 34, by sensing each revolution of the shaft 34, in order to provide controlled input to the system controller 44 relating to operation of the motor 26.

Additional embodiments can consist of the auxiliary power source 32 being any device that requires or prefers a constant RPM. These devices can be connected serially to provide a constant RPM for multiple devices or individually. In one embodiment, a clutch or other connection/disconnection method may be used to actuate or deactivate a particular device. In another embodiment, hydraulic valving could allow for the use of multiple devices with independent control, and additional external hydraulic circuits. These devices can include, but are not limited to, hydraulic pumps such as for extraction tools, air pumps such as for filling breathing apparatus tanks, and foam pumps such as for pressurizing the suppression foaming equipment.

Referring now to FIG. 2, the control circuit 14 will be described in further detail with reference to an AC generator as the auxiliary power source 32, although other applications referred to in the detailed description are also possible. As previously described, the control circuit 14 may include the system controller 44 and one or more of the system control sensors 78, as well as a reference signal generator 82. The system controller 44 can be a programmable controller having a microprocessor (not separately shown) that implements control algorithms for the control of the generator output, namely voltage and frequency. The system controller 44 controls the generator output by applying a control output signal 84 to the control valve assembly 42, directing the control valve assembly 42 to meter fluid, and hence power, to the motor 26 for driving the generator. The system controller 44 varies the power supplied to the motor 26 through the use of the control output signal 84. It should be appreciated that the control output signal 84 can be a pulse-width modulated voltage waveform or a variable DC output voltage applied to the solenoid 56 of the control valve assembly 42.

Vehicles today often rely on sensitive and delicate electronics equipment, wherein only the cleanest of power is acceptable for operation. Very little variance in the output frequency of an AC generator is tolerable in order to operate various devices such as computers and communications equipment. Merely close frequency output in relation to desired frequency output is not good enough. Accordingly, it may be desirable to compare actual frequency with a predetermined frequency, rather than merely relying on sensed motor speed as an indirect method of determining the generator's output characteristics. Of course, it is to be understood that sensing rotational speed of the motor 26 may be adequate in certain applications. Nonetheless, in one embodiment, the electrical output 78d can be electrically coupled to the generator. The reference signal generator 82 can be in electrical communication with the system controller 44 and generates a reference signal 86 indicative of the predetermined output frequency. The system controller 44 may include a comparing sub-circuit 88 that implements control algorithms for comparing sensed output frequency with the reference signal 86. The comparing sub-circuit 88 can then generate and transmit control output signals for controlling the control valve assembly 42 such that the supply of fluid conducted to the motor 26 is sufficient to maintain desired generator output frequency. Additionally, if the system controller 44 detects a load change, and hence a change in output voltage and frequency, the system controller's predictive software algorithms can assist the generator in recovering to stable operation more quickly than a purely reactive generator system.

Similarly, electrical devices often have very precise voltage requirements wherein only the tightest voltage regulation is acceptable. Therefore, it may be advantageous for the system controller 44 to be in electrical communication with a generator voltage regulator (not shown). The system controller 44 can monitor the electrical output via the output sensor 78d and make adjustments using the generator voltage regulator resulting in very tightly controlled voltage. Additionally, the system controller 44 can anticipate and adjust the generator voltage regulator to promote system stability, especially during load variations, such as adjusting voltage to eliminate system oscillation and quickly recovering the desired voltage level following the application of an inductive load (e.g., starting a motor).

In one embodiment, the system controller 44 may also implement additional control algorithms for the electrical or mechanical system's output functions in response to load variations, physical changes in the electrical or mechanical system's operating environment or equipment, and communications from the user or other electronic modules. As the load on the electrical or mechanical system is increased or decreased, or the hydraulic fluid viscosity changes due to temperature fluctuations and such, or the operating characteristics of the pump 16, motor 26, or control valve assembly 42 change due to ambient conditions or wear, the system controller 44 can further adjust outputs to maintain consistent operation of the electrical or mechanical system.

The control circuit 14 may include an operator interface module 90 enabling an operator of system 10 to communicate with the system controller 44 through a bi-directional asynchronous serial communications interface. The operator interface module 90 can display system operating parameters through an information display 92. As non-limiting examples, the operating parameters displayed may include output voltage, frequency, current, hydraulic fluid temperature, total operating hours, and the like. The operator interface module 90 can also display or announce alarm conditions or faults detected by the system controller 44 and permit the operator to interact with the system controller 44 and influence the operation of auxiliary power source 32. The alarm conditions can be announced by an audible alert 94 included in the operator interface module 90. The operator may also influence the configuration of the system controller 44. For example, the operator may turn the hydraulic control system 10 on or off through an ON/OFF switch 96. Moreover, the operator may configure the system controller 44 to automatically turn the auxiliary power source 32 on when sufficient hydraulic pressure is detected. Further, the operator can instruct the system controller 44 to purge air from the hydraulic lines, and configure the maximum expected output values to be controlled by the hydraulic control system 10. The operator communicates with the system controller 44 through a keypad 98 disposed in the operator interface module 90. It should be appreciated that multiple interface modules may be linked together to add multiple operator interfaces if desired.

Figure 2A:
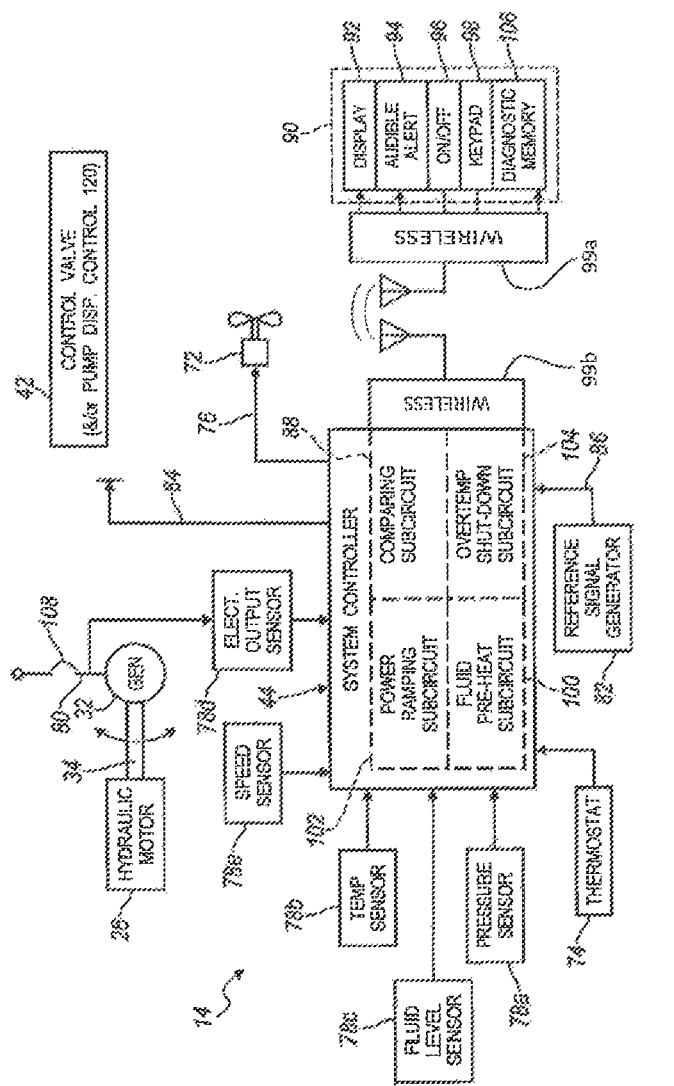

According to the control circuit 14 of the present invention illustrated in FIG. 2a, vehicle interface modules can be used by operators to perform all routine tasks or monitor any of the information available through the operator interface module 90. Operation and diagnostic monitoring of the generator can also be performed over commercial vehicle communications such as industry standard J-1939. The system controller 44 broadcasts messages on the J-1939 vehicle bus, and monitors the network for commands and requests for information. Additionally, personal computer (PC) and mobile device applications such as tablets, pads, smart phones, etc., can be used to perform the same functions as the operator interface module 90 when connected to the system controller serial communications such as J-1939 communications bus. As illustrated in FIG. 2a, the communication may also be wireless connection such as Wi-Fi, wide area network (WAN), or a personal area network (PAN) such as bluetooth, ZigBee, Z-Wave, IrDA, or the like. In this embodiment, the control circuit 14 includes a wireless device 99a in communication with the operator interface module 90 and a wireless device 99b in communication with the system controller 44. The wireless devices 99a and 99b communicate with each other. It should be appreciated that the system controller 44 may contain electronics hardware support to communicate externally via any or all of the aforementioned protocols.

In addition to the aforementioned communication methods and protocols, system information may be transmitted to and from a remote storage or location, for example by the system controller 44. The system controller 44 includes a communications module in communication with the control circuit and remote location. Methods for communicating the information such as data include, but are not limited to, Wi-Fi, cell service, and hardwire connection. The remote location may be a cloud-based service provided by the generator manufacturer, a vehicle component provider, a third-party entity, etc. In all cases, the information such as data communicated to and from the cloud-based service may be stored, analyzed, computed, re-transmitted, formatted, and otherwise acted upon for any purpose. Information such as data may be used for diagnostics of generator components and function of the control system 10, such as if system hydraulic pressure is low, the information is communicated to the remote storage or cloud-based site. It should be appreciated that this data may be recorded, time-stamped, or otherwise acted upon to store an ongoing history of operation for each generator, thereby allowing for scheduled and un-scheduled maintenance, warranty coverage allowance decisions, diagnostics, prognostics, system readiness, and the like.

As described above, embodiments may also be implemented in cloud computing environments. In this description and the following claims, "cloud" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Referring again to FIG. 1a, when the electrical or mechanical system to be driven is idle or shut down, the valves 50a and 50b can be normally closed, directing all fluid flow into the bypass conduit 40, and depriving the motor 26 of power. At the operator's request, through the operator interface module 90, which communicates with the system controller 44, the valves 50a and 50b can begin activating the electrical or mechanical system by providing flow to the hydraulic motor 26.

In another embodiment, the application of hydraulic pressure to the fluid circuit 22 may be interpreted by the system controller 44 as a command to commence electrical or mechanical system operation. The operator may wish to configure the system controller 44 to automatically power the auxiliary power source 32 when the pump 16 is operating. If pressure sufficient for system operation is detected by the pressure sensor 78a, system operation can automatically commence without further instruction from the operator. On the other hand, if the hydraulic pressure falls below that required for system operation, the system controller 44 can direct valve(s) 50, 50a, 50b to close fully, diverting all fluid flow into the bypass conduit 40, thereby shutting down operation of the motor 26.

The system controller 44 may further include a fluid pre-heating sub-circuit 100. If the temperature sensor 78b detects that hydraulic fluid in the control system 10 is too cold for normal operation, the system controller 44 can implement the fluid pre-heating sub-circuit 100 to warm the fluid to a safe operating temperature. The fluid pre-heating sub-circuit 100 can generate control output signals for controlling the control valve assembly 42 such that fluid bypasses the motor 26 entirely until safe fluid operating temperature is obtained, avoiding damage to the mechanical components. The system controller 44 can hold the valve(s) 50, 50a, 50b fully closed to circulate the hydraulic fluid through the bypass conduit 40. Normal mechanical friction will warm the fluid until it reaches a first predetermined temperature, at which point the valve 50, 50a, 50b can be opened only enough to pass the warming fluid slowly through the motor 26. It should be appreciated that normal mechanical friction will warm the fluid further until it reaches a second predetermined temperature, at which point full power operation can commence.

Further, if the temperature sensor 78b detects the hydraulic fluid is too cold for any operation, the system controller 44 can implement an auxiliary heater 131 (see FIG. 12) disposed within the hydraulic circuit 12 in front of the inlet 18 of the pump 16. The auxiliary heater 131 can have any number of power sources, AC power, DC power, diesel power, or propane power. It should be appreciated that multiple sources of energy are possible to preheat the hydraulic fluid.

The application of the fluid pre-heating sub-circuit 100 can be incredibly advantageous in extremely low temperatures where the hydraulic fluid can partially congeal. If fluid were permitted to pass through the motor 26 immediately, prior to frictional warming through the bypass conduit 40, lumps of congealed fluid can momentarily obstruct the motor gears causing the motor 26 to briefly decelerate and then accelerate. The deceleration and acceleration caused by lumps in the fluid passing through the motor gears occurs almost instantaneously, resulting in large voltage spikes at the output of the auxiliary power source 32 (in the case of a generator). The duration of the voltage spike is very abrupt and the magnitude of the voltage spike can be sufficient to damage various electrical loads. The fluid pre-heat sub-circuit 100 substantially minimizes this occurrence reducing warranty claims and the costs associated with, while greatly increasing customer satisfaction and goodwill.

Once pressure and temperature are sufficient, full system operation can begin. In order to bring the control system 10 up to power, the system controller 44 may utilize a pulse width modulation (PWM) output control circuit to control power delivered to the valve(s) 50, 50a, 50b, hence fluid delivered to the hydraulic motor 26. The duty cycle of the PWM outputs(s) can be gradually modified so the valve(s) 50, 50a, 50b apply fluid to the hydraulic motor 26 in a controlled manner. This gradual application of power allows the hydraulic control system 10 to gently overcome inertial effects, greatly reducing wear and increasing system component lifetimes. During operation, the PWM can have a dither, or noise added intentionally to the signal to prevent the valve(s) 50, 50a, 50b from sticking if the control signal is static. It should be appreciated that forces to overcome a partially stuck valve are greater than that of one that is continually in motion and can cause minor instability. It should also be appreciated that the dither added to the PWM can help prevent the valve(s) 50, 50a, 50b from sticking and increase system stability due to valve position movability remaining fairly constant.

Figure 4:
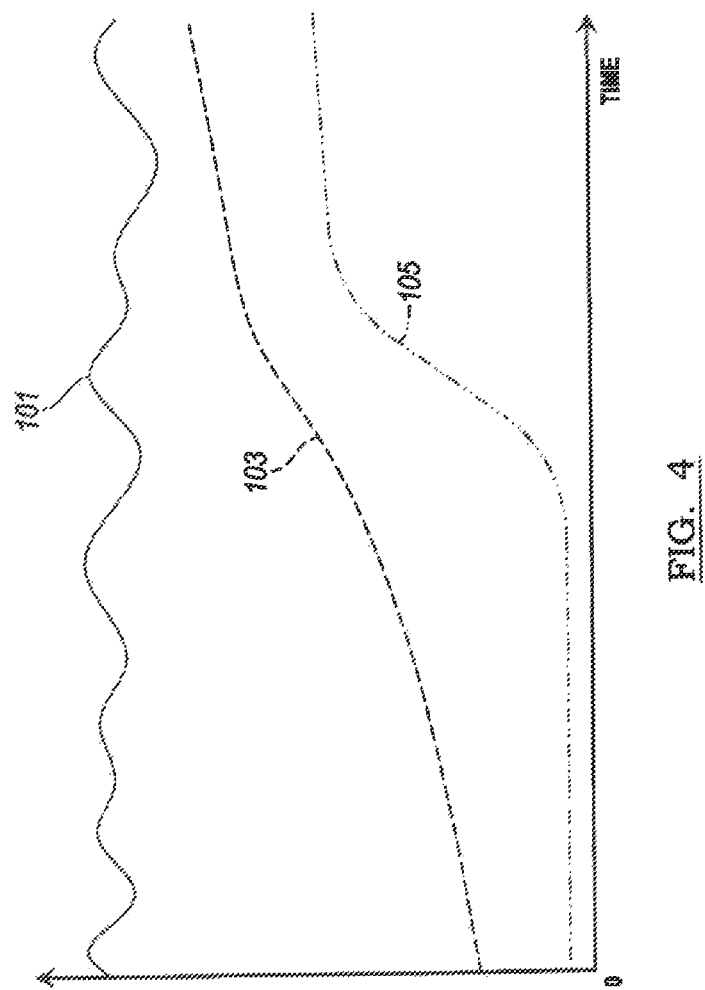
FIG. 4 is a graph generally displaying system characteristics during cold start operation for the control system of FIG. 1.

Referring now to FIG. 4, a graphical representation of cold start operation parameters of the control system 10, utilizing the fluid pre-heating sub-circuit 100 and the power ramping PWM control circuit is illustrated. Pump speed 101 generally depicts revolutions per minute (RPMs) of the pump 16 over time at initial system cold temperature start-up. The pump speed 101 can fluctuate over time as the vehicle engine speed fluctuates. Fluid temperature 103 generally depicts temperature of the fluid in the fluid circuit 22 during cold start operation. At cold start, hydraulic fluid can bypass the motor 26 until it warms to a sufficient temperature, at which point fluid is slowly diverted to the motor 26 to gradually supply power to the control system 10. Also at cold start, hydraulic fluid can bypass the fluid cooler 70 by the use of an electronically controlled valve or a mechanical pressure relief valve until the fluid warms to a temperature requiring cooling, at which point fluid flow gradually resumes proportional to fluid temperature through the fluid cooler 70. Further, during cold start operation, hydraulic fluid flow can be entirely blocked by the closure of the valve 50, 50a, 50b wherein the fluid temperature can rise within the pump 16 until a sufficient temperature is reached, at which point fluid flow can resume proportional to fluid temperature by the gradual opening of the valve(s) 50, 50a, 50b. During this ramp-up, fluid temperature 103 can increase further permitting full system operation to begin. Motor speed 105 generally depicts operation of the motor 26 (in RPMs) during cold start. The motor 26 can get little or no power, while the fluid warms as it circulates through the bypass conduit 40. Once a desired temperature is obtained, the motor speed 105 slowly ramps up as fluid is gradually supplied to the motor 26. Once full system operation commences, the motor speed 105 remains substantially constant, despite fluctuations in engine speed and hence the pump speed 101.

Further, the system controller 44 may include over-temperature shut-down control measures. When the temperature of the hydraulic fluid exceeds safe operating conditions, the system controller 44 can notify the operator of the electrical or mechanical system that excessive temperatures are being detected, and action may be required to prevent damage to the control system 10. When the temperature exceeds yet another temperature threshold, the system controller 44 can start an internal timer. If the timer expires, the valve 50, 50a, 50b may be fully closed by the system controller 44, bypassing all fluid flow and shutting down the control system 10 unless the operator issues an emergency override instruction through the keypad 98, or other optional interface to prevent the shutdown and keep the electrical or mechanical system operating.

Further, the system controller 44 may include a PWM sub-circuit to control a fan in proximity with the auxiliary power source 32 to cool the auxiliary power source 32. The auxiliary power source 32 may also be cooled by a suitable liquid cooled by an external fluid cooler.

Further, the control system 10 may include an air filter to protect key components, primarily the auxiliary power source 32, from foreign contaminants. A sensor associated with the air filter to determine when the air filter is clogged or otherwise needs replacing may be electrically coupled to the system controller 44.

The system controller 44 may further include a means of enabling or disabling the primary power source 24 such as disabling the power take off (PTO) via a primary power source control. In one embodiment, the system controller 44 may be configured to disable the primary power source 24 to prevent damage to the hydraulic control system 10 such as when the system operating temperature exceeds a predetermined limit. In another embodiment, the system controller 44 may be configured to not allow the primary power source 24 to be enabled when conditions are such that damage to the hydraulic control system 10 or an operator could occur.

The system controller 44 may also have the ability to record all abnormal conditions and faults to a diagnostic memory 106. The faults can be retrieved from the diagnostic memory 106 by an operator and displayed by the operator interface module 90, or any aforementioned communication methods, to evaluate the conditions seen by the hydraulic control system 10 and assist in any necessary troubleshooting. Recorded conditions may include, but are not limited to, valve voltage faults, valve current faults, over current faults, current sensing faults, temperature sensing faults, ground faults, number of over temperature overrides, fan faults, voltage sensing faults, hours run with over temperature, highest recorded frequency, highest recorded voltage, highest measured current, highest measured temperature, hours run with overcurrent, hours on oil filter, calibration values, maximum current values, and total hours.

Yet another advantage of the control system 10 is that it can be a self-contained system that can be readily plugged into external hydraulic and electrical connections, or retrofit to a vehicle having a power take-off, engine driven belt drive, or any other power supply source. Moreover, the control system 10 may include a circuit breaker 108 as yet another protective feature. The circuit breaker 108 may be located in series with the output conductors 80 connected to output terminals of the auxiliary power source 32. It should be appreciated that the circuit breaker 108 can operate conventionally by opening an external circuit (not shown), which is connected to the conductors 80 to conduct electrical power to powered equipment.

The circuit breaker 108 may be remotely trip-able. The system controller 44 or a standalone electronic sub-circuit (not shown) may be used to monitor the generator output current and determine if the circuit breaker 108 should be tripped. In one embodiment, custom tripping profiles may be created to meet application specific requirements. In another embodiment, electrically controlled contacts (not shown) controlled by the system controller 44 or a standalone electronic sub-circuit may be substituted for the circuit breaker 108. As another safety feature, sensors can be added to the control system 10 allowing the system controller 44 to detect if a cover or door (not shown), which is to protect a user from high voltages, is opened. In turn, the auxiliary power source 32 can be disabled by opening the circuit breaker 108 or opening the electrically controlled contacts.

The control system 10 can contain an electrical sub-circuit to shut down user prioritized loads dependent upon system conditions such as overheating and resources such as inadequate source power. The control system 10 can then communicate to a user the ability to return loads to power as the system conditions allow.

The control system 10 can have a means of troubleshooting wherein the system controller 44 contains an electrical sub-circuit containing the ability to manually control the valve assembly 42 and/or cooling fan 72.

A general overview of the operation of the control system 10, according to an embodiment, is provided below. The system controller 44 can sense adequate operating pressure in the fluid circuit 22. If the system controller 44 does not automatically interpret sufficient pressure as a command to commence operation, it can wait to receive a command signal from an input, operator, or other electronic module to activate the hydraulically powered mechanical or electrical system. The system controller 44 can then check the status and values of the control inputs to ensure operation will be safe and effective. If the hydraulic fluid temperature is too low, the fluid pre-heat sub-circuit 100 can cause the fluid to warm to safe operating temperatures. The system controller 44 can then gradually apply power to the motor 26 by slowly opening the valve(s) 50, 50a, 50b, according to power ramping PWM control algorithms. Appropriate control signals can be applied by the system controller 44 to outputs in response to the control inputs to achieve the desired control and function of the control system 10. If the hydraulic fluid temperature becomes too high for safe operation, over-temperature shut-down can be implemented to shut down the operation of the electrical or mechanical system. In one embodiment, the system's operating parameters may be sent via serial communications using a proprietary protocol to the operator interface module 90 or other electronic module utilizing standard protocols for J-1939 and WLAN. In another embodiment, the system's operating parameters may be sent via a standard communication protocol to the vehicle data bus. Further, the operator interface module 90 can communicate with the system controller 44 using the vehicle data bus. If a command is received from an operator or other electronic module to cease operation, or the hydraulic pressure falls below that required for operation, the system controller 44 can shut down the electrical or mechanical system by fully closing the valve(s) 50, 50a, 50b, bypassing all hydraulic fluid flow to the motor 26.

Figure 5:
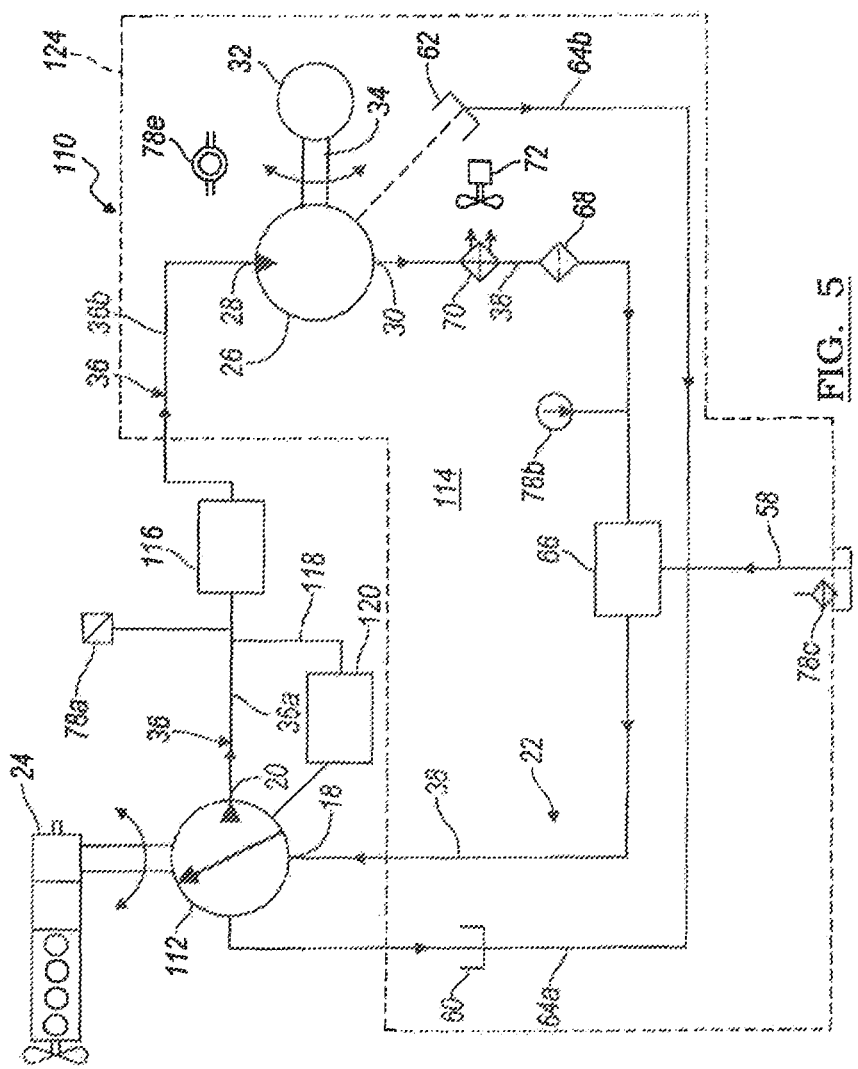
FIG. 5 is a schematic view of yet another embodiment of the control system of FIG. 1.

Yet another embodiment of the control system 10 is illustrated in FIG. 5. A control system 110 is similar to the control system 10 described with reference to FIG. 1, however rather than using the control valve assembly 42 to regulate the amount of the output of the pump 16 that passes through the motor 26, a variable displacement pump 112 is utilized which has an external input which enables the control circuit 14 to vary the pump displacement to achieve the desired flow rate needed for the motor 26. The control circuit 114 of the FIG. 5 embodiment is otherwise generally similar to the control circuit 14 utilized in the FIG. 1 embodiment and like components function in a similar manner as described previously.

In operation, the output from the pump 112 provides hydraulic fluid to the motor 26. As previously described, the control valve assembly 42 utilized in the FIG. 1 embodiment is no longer required provided the pump minimum displacement is sufficiently low. If the minimum pump displacement is substantial, i.e., over 20% of maximum pump displacement, the control valve assembly 42 as previously described can be added in order to deactivate the motor 26 at desired times. When the control valve assembly 42 is not used, an optional pressure regulator 116 can be provided to maintain desired minimum back pressure on the outlet of the pump 112 which is sufficient to operate a pump displacement control 120 which is supplied with hydraulic fluid via line 118.

The pump displacement control 120 cooperates with the pump 112 to vary the displacement of the pump 112 as needed. The pump displacement control 120 can have a hydraulic output or alternatively a mechanical output as dictated by the pump design. The pump displacement control 120 varies the pump displacement as a function of a control signal 84 received from the system controller 44 illustrated in FIG. 2. In one embodiment, the pump displacement control 120 is hydraulically powered, and in another embodiment, an electrically operated actuator such as a stepper motor could be used to vary pump displacement. The control system 110 of the FIG. 5 embodiment is designed to have reduced pumping losses and associated energy consumption when compared to the control system 10 of FIG. 1 in which high pressure fluid is routinely bypassed about the motor 26 at high pump speed conditions.

Figure 6:
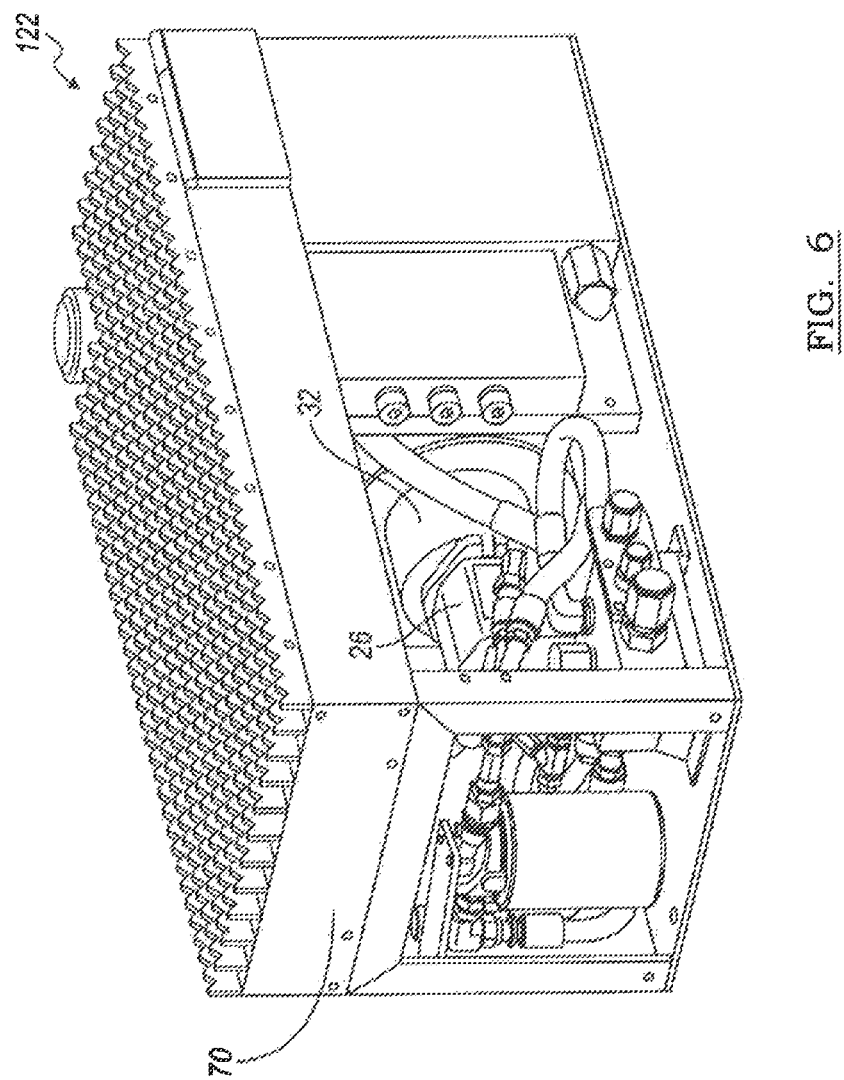
FIG. 6 is a perspective view of an auxiliary module unit suitable for mounting a hydraulic driven generator to an exterior of a vehicle.
Figure 8:
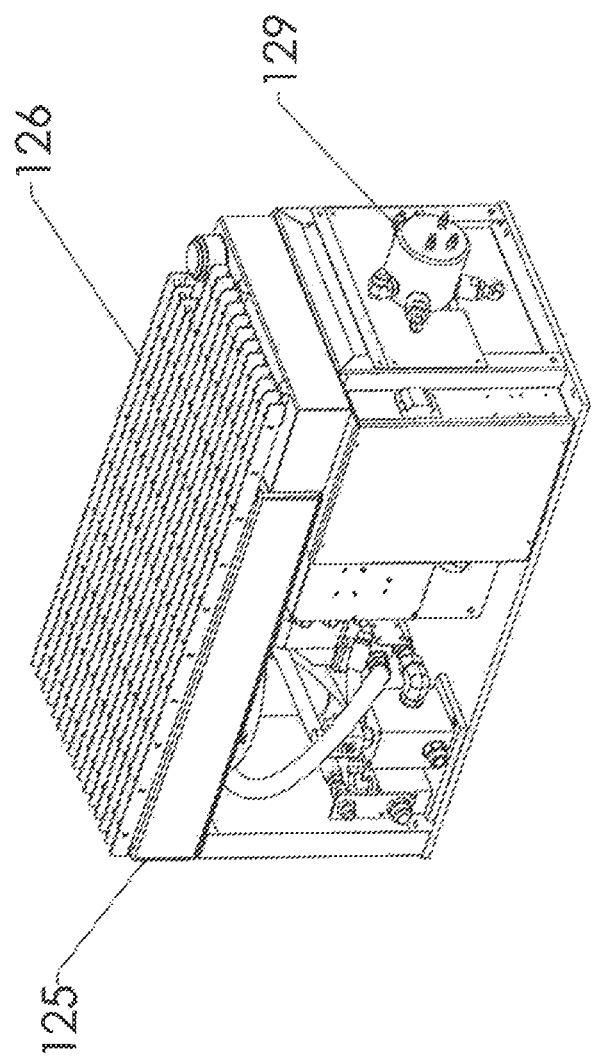
FIG. 8 is a perspective view of the auxiliary module unit shown in FIG. 6 with a serially connected secondary auxiliary power source in the form of a pump for hydraulic extraction equipment.

FIGS. 6 and 8 illustrate one embodiment of a packaging module 122 for mounting the control system 10 of the present invention to a motor vehicle. The illustrations of module 122 in FIGS. 6 and 8 are at opposite orientations.

Typically, there this insufficient space in the vehicle engine compartment or adjacent the vehicle drive train to mount a hydraulic motor and associated generator inside the vehicle body. The module 122 is suitable for attachment to an exterior of the vehicle. A large portion of the control system 10 can be mounted within the module 122. The portion of the control system 10 suitable for mounting outside the module 122 is illustrated in phantom outline in FIG. 5 by reference number 124. In one embodiment, the variable displacement pump 112 and associated pump displacement control 120 will be mounted directly to the primary power source such as internal combustion engine or a power takeoff associated with an internal combustion engine of the vehicle. The motor 26 and the auxiliary power source 32 are mounted externally in the module 122 as are the other components identified in portion 124 of FIG. 5.

The module 122 when mounted external to the vehicle not only eliminates space problems but further facilitates dissipating any excess heat generated by the pump 112, motor 26, and auxiliary power source 32 via the fluid cooler 70. The module 122 may be configured to direct cooling air through the fluid cooler 70 in an upward or downward direction to provide efficient cooling and to reduce mounting space requirements. The module 122 can be provided with an open grate top 126 (labeled in FIG. 8) which allows air to freely circulate and exhaust through the module 122 and provides a non-slip working surface for the system user. In one embodiment, the module 122 has the cooling fan 72 forcing cooling air about the system components. The module 122 may also include a baffle (not shown) to separate cooler intake air from mixing with warmer exhausted air. The fluid circuit supply and discharge hydraulic conduits can be disposed to exit the control system 10 in a generally downward direction in relation to the system mounting orientation to provide reduced mounting space requirements.

The fluid cooler 70 can be disposed within a closed tolerance enclosure 125 also containing the cooling fan 72. The tolerance enclosure 125 can generally provide a more even airflow throughout the surface of the fluid cooler 70 in order to increase cooler efficiency.

Figure 9:
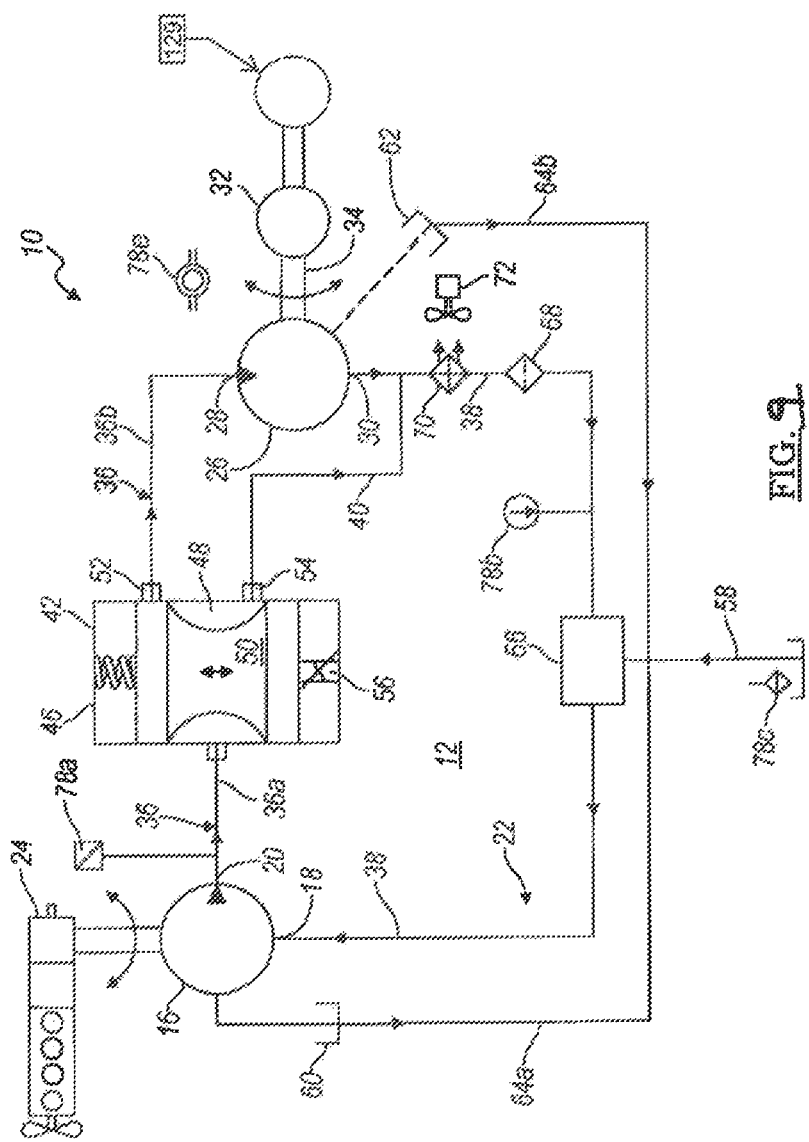
FIG. 9 is a schematic view of still another embodiment of the control system of FIG. 1.
Figure 10:
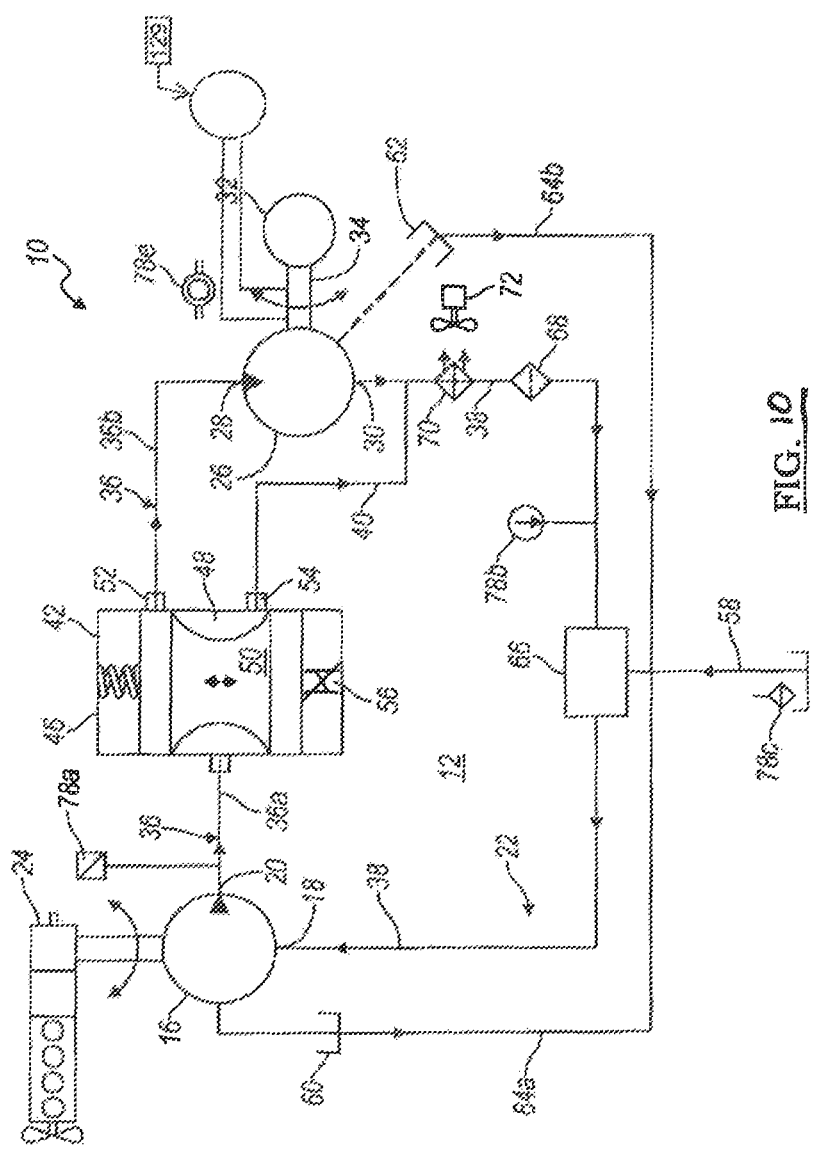
FIG. 10 is a schematic view of a further embodiment of the control system of FIG. 1.
Figure 11:
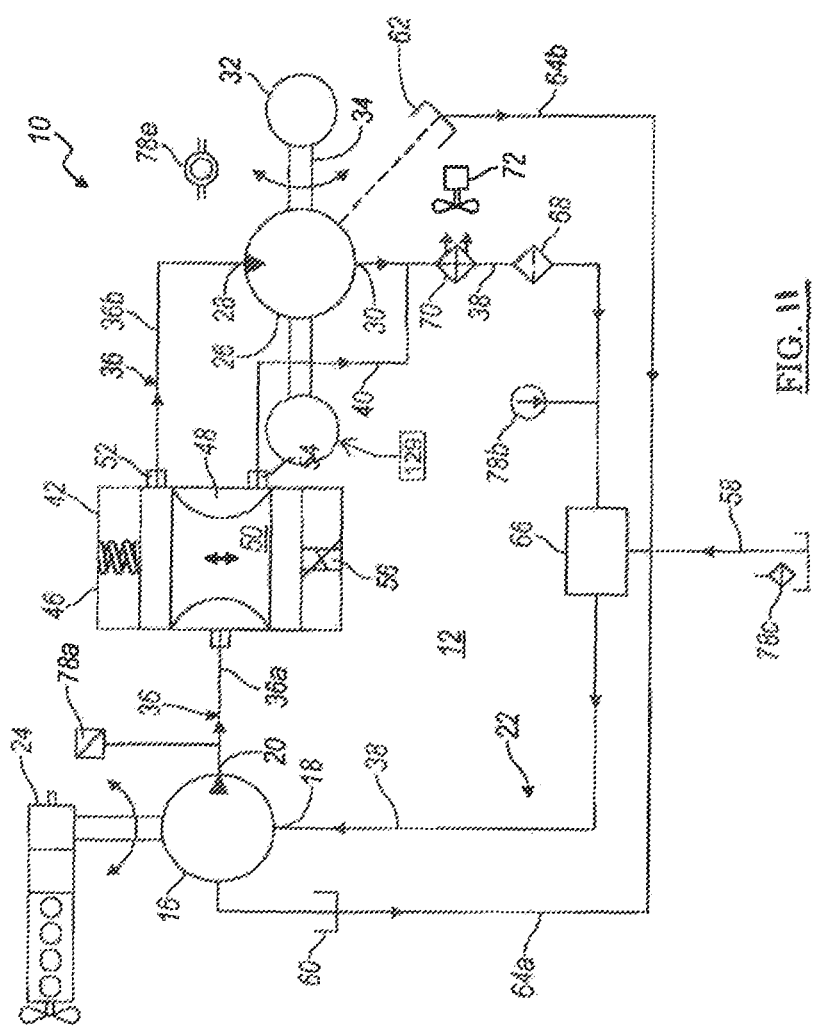
FIG. 11 is a schematic view of a yet further embodiment of the control system of FIG. 1.
Figure 13:
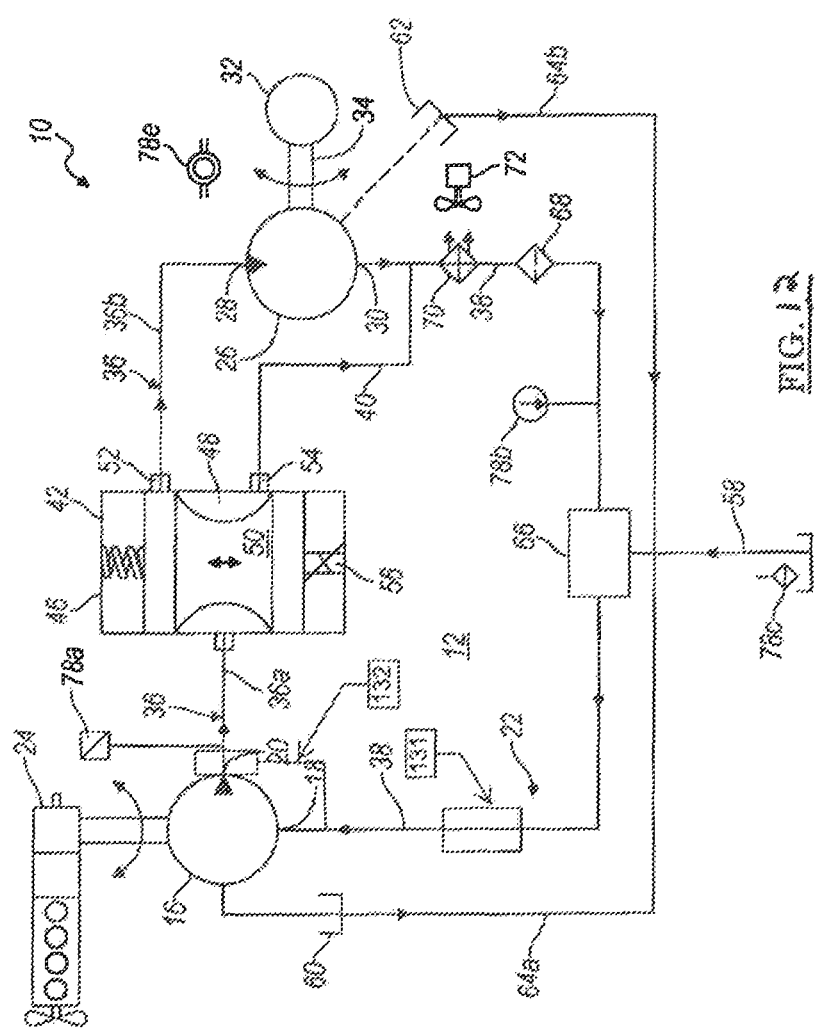

As indicated, the motor 26 and the auxiliary power source 32 (i.e., generator) of the control system 10 are mounted within the module 122. As described in further detail below with reference to FIGS. 9, 10, and 11, the control system 10 may include a secondary auxiliary power source 129. The secondary auxiliary power source 129 may be serially connected to the auxiliary power source 32 (as shown in FIG. 9), in parallel with the auxiliary power source 32 and connected to the shaft 34 of the motor 26 (as shown in FIG. 10), or serially connected to the motor 26 via a shaft separate from the shaft 34 (as shown in FIG. 11). For instance, as illustrated in FIG. 8, the control system 10 mounted within the module 122 includes the secondary auxiliary power source 129, in the form of a pump for hydraulic extraction equipment, which is serially connected to the auxiliary power source 32 and extends out of the module 122.

Figure 7:
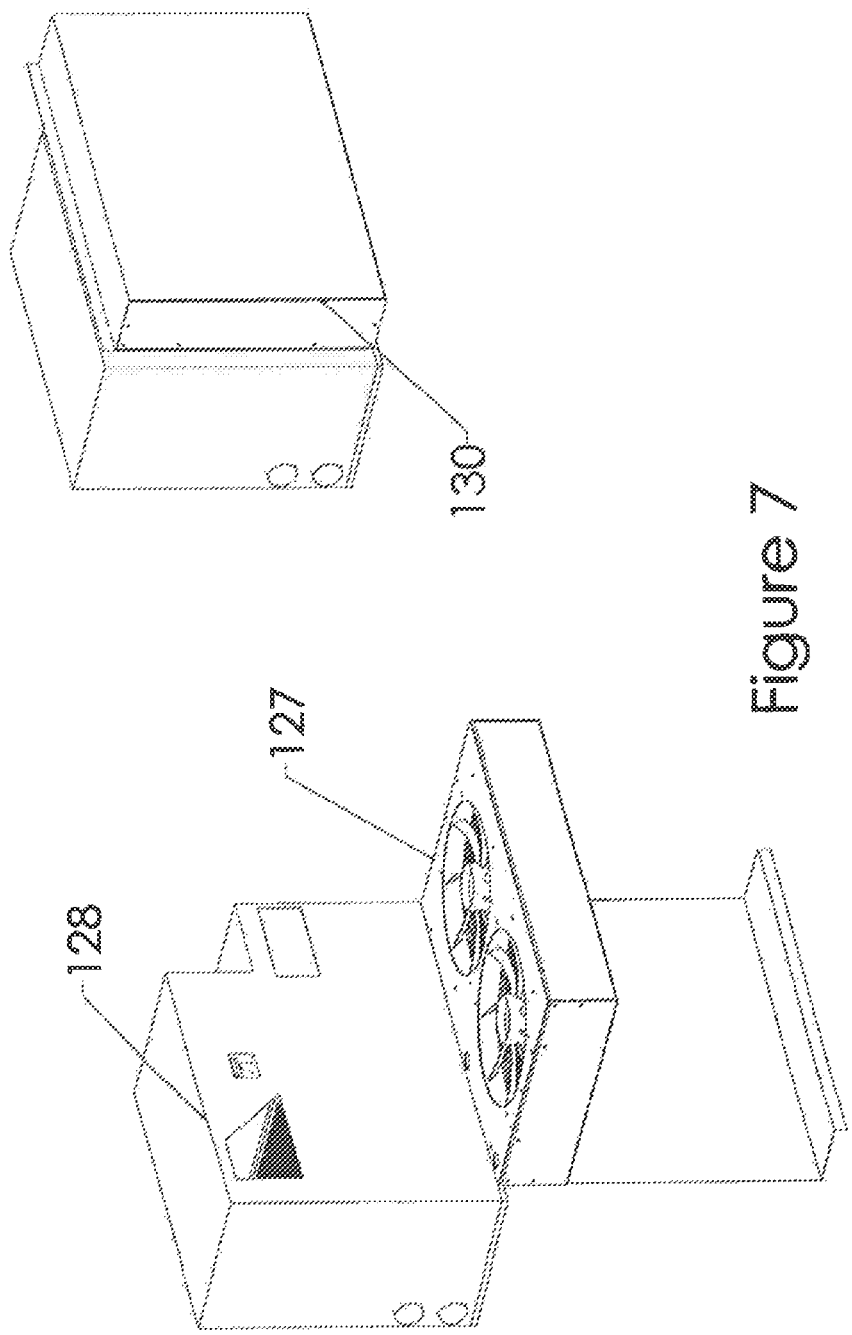
FIG. 7 is a perspective view of an auxiliary module unit having a fold-out cooler and being suitable for submersion.

Referring to FIG. 7, the control system 10 can be configured with the cooler 70 and the fan 72 contained together in a cooler/fan assembly 127. The cooler/fan assembly 127 can be positioned to open air when the control system 10 is being operated or can be repositioned adjacent to enclosure 128 to create a space saving module 130. The repositioning of the cooler/fan assembly 127 can be accomplished by using hinges, slides, rollers, or any similar method. To increase cooling efficiency, an auxiliary fan (not shown) may be positioned within the enclosure 128 to ensure proper cooling of the auxiliary power source 32. In addition, a position sensor (not shown) can be added in communication with the system controller 44 wherein the position of the cooler 70 can be determined in that if the cooler 70 is in the storage position, the control system 10 will not function. Further, a temperature sensor may be disposed on or near the auxiliary power source 32 and be in electrical communication with the system controller 44. The system controller 44 may contain an electrical sub-circuit to monitor the temperature and shut down the control system 10 if predetermined unsafe conditions exist.

The enclosure 128 may contain interlocks in communication with the system controller 44 to determine if electrical connections are exposed to an operator or if the cooler/fan assembly 127 is folded out and unsafe for travel. The enclosure 128 can be capable of withstanding water immersion for use with various requirements of vehicles the control system 10 may be installed on.

The control system 10 may have other features. For instance, the system controller 44 may control a voltage regulator (not shown) for the auxiliary power source 32 using the output of the auxiliary power source 32 or another source of AC or DC power. The control system 10 may output multiple types of power simultaneously, such as DC power or 60 Hz, 50 Hz and 400 Hz AC power. It should be appreciated that there are many combinations of power possible and the combinations listed are merely exemplary. It should also be appreciated that the auxiliary power source 32 can be any device requiring or preferring more environmental protection than can be offered where the primary power source 24 is located and, in the case of a typical engine driven vehicle, the power available is located at external hydraulic and electrical connections or at a vehicle's power take-off.

Referring now to FIGS. 9, 10, and 11, with continued reference to FIG. 1, additional embodiments of the control system 10 are illustrated. The control system 10 shown in each of FIGS. 9, 10, and 11 embodiments is the same as control system 10 described with reference to FIGS. 1 and 2 with the exception that the secondary auxiliary power source 129 is employed in addition to the auxiliary power source 32. That is, the control system 10 has the ability to include two or more auxiliary power sources. The auxiliary power sources 32 and 129 can be coupled together serially or in parallel. In FIG. 9, the secondary auxiliary power source 129 is serially connected to the auxiliary power source 32. In FIG. 10, the secondary auxiliary power source 129 is in parallel with the auxiliary power source 32 and is connected to the shaft 34 of the motor 26. In FIG. 11, the secondary auxiliary power source 129 is serially connected to the motor 26 via a shaft separate from the shaft 34. The auxiliary power sources 32 and 129 may be drivably connected to a clutch or other connection and disconnection apparatus to independently control functionality. Further, if one or more auxiliary power sources 32 and 129 require a different rotational speed, then they may be drivably connected to an under-drive or over-drive device such as a gear box, a belt drive, or a chain system.

Referring now to FIG. 12, with continued reference to FIG. 1, a still further embodiment of the control system 10 is illustrated. The control system 10 shown in FIG. 12 is the same as the control system 10 described with reference to FIG. 1 with the exception that one or more additional control valve assemblies 131, 132 are employed. For instance, the control system 10 may include a control valve assembly 132 disposed serially and/or parallel with respect to the supply conduit 36 such that it is interposed between the outlet 20 of the pump 16 and the control valve assembly 42. The control valve assembly 132 may be employed to warm and/or isolate and protect the rest of the hydraulic control system 10 from conditions existing at the pump 16 such as cold hydraulic fluid. The control valve assembly 132 may be slowly opened to allow fluid to propagate to the rest of the control system 10 as conditions improve such as the hydraulic fluid warming to an appropriate temperature.

A controller, computing device, server or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

Several (or different) elements discussed above, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor".

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A control system comprising:
   a variable displacement hydraulic pump drivably connectable to a primary power source, said pump having an inlet to receive fluid and an outlet to discharge fluid under pressure;
   a hydraulic motor having an inlet to receive fluid under pressure and an outlet to discharge spent fluid, said motor being drivably connectable to an auxiliary power source;
   a fluid circuit including a supply conduit to fluidly communicate with said outlet of said pump and said inlet of said motor;
   a control valve assembly disposed in said supply conduit to fluidly communicate between and with said pump and said motor, said control valve assembly including at least two proportional valves disposed in parallel, wherein one of said at least two proportional valves is a first valve providing coarser flow control resolution and another of said at least two proportional valves is a second valve smaller than said first valve providing finer flow control resolution;
   a control circuit in communication with said control valve assembly to control the pump output such that said motor is driven at a constant rotational speed to thereby drive the auxiliary power source at a constant rotational speed despite fluctuations in rotational speed of the primary power source; and
   a system controller in communication with said control circuit, said system controller including a communications module for communicating information with a remote location to transmit and receive the information to and from the remote location, wherein the remote location is a cloud-based service provided by one of a generator manufacturer, a vehicle component provider, or a third-party entity.

2. The control system as set forth in claim 1 wherein said communication module communicates the information via one of Wi-Fi, cell service, and hardwire connection.

3. The control system as set forth in claim 1 wherein the information communicated to and from the cloud-based service is stored, analyzed, computed, re-transmitted, formatted, and otherwise acted upon for any purpose.

4. The control system as set forth in claim 1 wherein the information communicated is used for diagnostics of generator components and function of the control system, the information being communicated to the cloud-based service.

5. The control system as set forth in claim 1 wherein the information is recorded, time-stamped, or otherwise acted upon to store an ongoing history of operation for each generator of the control system.

6. The control system as set forth in claim 1 including an interface module having a display in electrical communication with said control circuit to display real time system operating characteristics to an operator.

7. The control system as set forth in claim 1 wherein said control circuit includes an electrical output sensor coupled to a generator for determining output voltage of the generator, a reference signal generator to generate a reference signal indicative of a predetermined output voltage, and a comparing sub-circuit to compare sensed output voltage with the reference signal and to generate a control signal to control the pump output such that the supply of fluid conducted to said motor is sufficient for the generator to maintain desired output voltage.

8. A control system comprising:
   a variable displacement hydraulic pump drivably connectable to a primary power source, said pump having an inlet to receive fluid and an outlet to discharge fluid under pressure;

a hydraulic motor having an inlet to receive fluid under pressure and an outlet to discharge spent fluid, said motor being drivably connectable to an auxiliary power source;

a fluid circuit including a supply conduit to fluidly communicate with said outlet of said pump and said inlet of said motor, said supply conduit including a valve supply conduit portion and a motor supply conduit portion to conduct fluid discharged by said pump to said motor and a return conduit to fluidly communicate with said outlet of said motor and said inlet of said pump, said return conduit to return fluid discharged by said motor to said pump;

a control valve assembly disposed in said supply conduit to fluidly communicate between and with said pump and said motor;

a control circuit in communication with said control valve assembly to control the pump output such that said motor is driven at a constant rotational speed to thereby drive the auxiliary power source at a constant rotational speed despite fluctuations in rotational speed of the primary power source;

a system controller in communication with said control circuit and a remote location to transmit and receive information to and from the remote location;

at least one proportional valve disposed between said valve supply conduit portion and said motor supply conduit portion to control a rotational speed of said motor; and wherein said at least one proportional valve includes at least two proportional valves disposed in parallel, wherein one of said at least two proportional valves is a first valve providing coarser flow control resolution and another of said at least two proportional valves is a second valve smaller than said first valve providing finer flow control resolution.

9. The control system as set forth in claim 8 wherein said system controller is in communication with said control valve assembly to provide a pulse width modulation (PWM) output control signal to control power delivered to said at least two proportional valves.

10. A control system comprising:

a variable displacement hydraulic pump drivably connectable to a primary power source, said pump having an inlet for receiving fluid and an outlet for discharging fluid under pressure;

a hydraulic motor having an inlet to receive fluid under pressure and an outlet to discharge spent fluid, said motor being drivably connectable to an auxiliary power source;

a fluid circuit including a supply conduit to fluidly communicate with said outlet of said pump and said inlet of said motor, said supply conduit including a valve supply conduit portion and a motor supply conduit portion to conduct fluid discharged by said pump to said motor and a return conduit to fluidly communicate with said outlet of said motor and said inlet of said pump, said return conduit to return fluid discharged by said motor to said pump;

a control valve assembly disposed in said supply conduit to fluidly communicate between and with said pump and said motor, wherein said control valve assembly comprises at least two proportional valves disposed in parallel, wherein one of said at least two proportional valves is a first valve providing coarser flow control resolution and another of said at least two proportional valves is a second valve smaller than said first valve providing finer flow control resolution;

a control circuit in communication with said control valve assembly to control the pump output such that said motor is driven at a constant rotational speed to thereby drive the auxiliary power source at a constant rotational speed despite fluctuations in rotational speed of the primary power source;

an interface module having a display in communication with said control circuit to display real time system operating characteristics to an operator and a wireless communication connection between said display device and said control circuit; and a system controller in communication with said control circuit, said system controller including a communications module for communicating information with a remote location to transmit and receive the information to and from the remote location, wherein the remote location is a cloud-based service provided by one of a generator manufacturer, a vehicle component provider, or a third-party entity.

11. The control system as set forth in claim 10 wherein said communication module communicates the information via one of Wi-Fi, cell service, and hardwire connection.

12. The control system as set forth in claim 10 wherein the information communicated to and from the cloud-based service is stored, analyzed, computed, re-transmitted, formatted, and otherwise acted upon for any purpose.

13. The control system as set forth in claim 10 wherein the information communicated is used for diagnostics of generator components and function of the control system, the information being communicated to the cloud-based service.

14. The control system as set forth in claim 10 wherein the information is recorded, time-stamped, or otherwise acted upon to store an ongoing history of operation for each generator of the control system.

15. The control system as set forth in claim 10 wherein said system controller is in communication with said control valve assembly to provide a pulse width modulation (PWM) output control signal to control power delivered to said at least one proportional valve.

16. The control system as set forth in claim 10 wherein said control circuit includes an electrical output sensor coupled to a generator for determining output voltage of the generator, a reference signal generator to generate a reference signal indicative of a predetermined output voltage, and a comparing sub-circuit to compare sensed output voltage with the reference signal and to generate a control signal to control the pump output such that the supply of fluid conducted to said motor is sufficient for the generator to maintain desired output voltage.

17. A control system comprising:

a variable displacement hydraulic pump drivably connectable to a primary power source, said pump having an inlet for receiving fluid and an outlet for discharging fluid under pressure;

a hydraulic motor having an inlet to receive fluid under pressure and an outlet to discharge spent fluid, said motor being drivably connectable to an auxiliary power source;

a fluid circuit including a supply conduit to fluidly communicate with said outlet of said pump and said inlet of said motor, said supply conduit including a valve supply conduit portion and a motor supply conduit portion to conduct fluid discharged by said pump to said motor and a return conduit to fluidly communicate with said outlet of said motor and said inlet of said pump, said return conduit to return fluid discharged by said motor to said pump;

a control valve assembly disposed in said supply conduit to fluidly communicate between and with said pump and said motor, wherein said control valve assembly comprises at least one proportional valve disposed between said valve supply conduit portion and said motor supply conduit portion to control a rotational speed of said motor;

a control circuit in communication with said control valve assembly to control the pump output such that said motor is driven at a constant rotational speed to thereby drive the auxiliary power source at a constant rotational speed despite fluctuations in rotational speed of the primary power source;

an interface module having a display in communication with said control circuit to display real time system operating characteristics to an operator and a wireless communication connection between said display device and said control circuit;

a system controller in communication with said control circuit and a remote location to transmit and receive information to and from the remote location; and wherein said at least one proportional valve comprises at least two proportional valves disposed in parallel, wherein one of said at least two proportional valves is a first valve providing coarser flow control resolution and another of said at least two proportional valves is a second valve smaller than said first valve providing finer flow control resolution.

18. A method of controlling a system, the method comprising steps of:

providing a variable displacement hydraulic pump drivably connectable to a primary power source, the pump having an inlet to receive fluid and an outlet to discharge fluid under pressure, a hydraulic motor having an inlet to receive fluid under pressure and an outlet to discharge spent fluid, the motor being drivably connectable to an auxiliary power source, a fluid circuit including a supply conduit to fluidly communicate with the outlet of the pump and the inlet of the motor, and a control valve assembly disposed in the supply conduit to fluidly communicate between and with the pump and the motor, the control valve assembly including at least two proportional valves disposed in parallel, wherein one of the at least two proportional valves is a first valve providing coarser flow control resolution and another of the at least two proportional valves is a second valve smaller than said first valve providing finer flow control resolution;

controlling, by a control circuit in communication with the control valve assembly, the pump output such that the motor is driven at a constant rotational speed to thereby drive the auxiliary power source at a constant rotational speed despite fluctuations in rotational speed of the primary power source; and communicating, by a system controller including a communications module in communication with the control circuit and a remote location, information to and from the remote location, wherein the remote location is a cloud-based service provided by one of a generator manufacturer, a vehicle component provider, or a third-party entity.

19. The method as set forth in claim 18 including the step of communicating, by the communication module of the system controller, the information via one of Wi-Fi, cell service, or hardwire connection.

20. The method as set forth in claim 18 wherein the information communicated to and from the cloud-based service is stored, analyzed, computed, re-transmitted, formatted, and otherwise acted upon for any purpose.

21. The method as set forth in claim 18 wherein the information communicated is used for diagnostics of generator components and function of the control system, the information being communicated to the cloud-based service.

22. The method as set forth in claim 18 wherein the information is recorded, time-stamped, or otherwise acted upon to store an ongoing history of operation for each generator of the control system.

23. A method of controlling a system, the method comprising steps of:

providing a variable displacement hydraulic pump drivably connectable to a primary power source, the pump having an inlet to receive fluid and an outlet to discharge fluid under pressure, a hydraulic motor having an inlet to receive fluid under pressure and an outlet to discharge spent fluid, the motor being drivably connectable to an auxiliary power source, a fluid circuit including a supply conduit to fluidly communicate with the outlet of the pump and the inlet of the motor, the supply conduit including a valve supply conduit portion and a motor supply conduit portion to conduct fluid discharged by the pump to the motor and a return conduit to fluidly communicate with the outlet of the motor and the inlet of the pump, the return conduit to return fluid discharged by the motor to the pump, and a control valve assembly disposed in the supply conduit to fluidly communicate between and with the pump and the motor;

controlling, by a control circuit in communication with the control valve assembly, the pump output such that the motor is driven at a constant rotational speed to thereby drive the auxiliary power source at a constant rotational speed despite fluctuations in rotational speed of the primary power source;

communicating, by a system controller in communication with the control circuit and a remote location, information to and from the remote location;

wherein the step of providing includes at least one proportional valve disposed between the valve supply conduit portion and the motor supply conduit portion to control a rotational speed of the motor; and wherein the at least one proportional valve comprises at least two proportional valves disposed in parallel, wherein one of the at least two proportional valves is a first valve providing coarser flow control resolution and another of the at least two proportional valves is a second valve smaller than the first valve providing finer flow control resolution.

24. The method as set forth in claim 23 including the step of providing, by the system controller is in communication with the control valve assembly, a pulse width modulation (PWM) output control signal to control power delivered to the at least two proportional valves.

* * * * *